(12) United States Patent
Sun et al.

(10) Patent No.: US 12,534,606 B2
(45) Date of Patent: Jan. 27, 2026

(54) FUNCTIONALIZED PROPYLENE BASED ELASTOMER COMPOSITION AND METHOD OF MAKING

(71) Applicant: ExxonMobil Chemical Patents Inc., Baytown, TX (US)

(72) Inventors: Ying Ying Sun, Shanghai (CN); Liang Li, Shanghai (CN); Shanshan Zhang, Houston, TX (US); Bin Zhao, Songjing (CN); Zhen Yu Gong, Shanghai (CN); Yi Ping Ni, Shanghai (CN); Qingyun Qian, Shanghai (CN); Peite Bao, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 693 days.

(21) Appl. No.: 17/785,152

(22) PCT Filed: Dec. 14, 2020

(86) PCT No.: PCT/US2020/064847
§ 371 (c)(1),
(2) Date: Jun. 14, 2022

(87) PCT Pub. No.: WO2021/126763
PCT Pub. Date: Jun. 24, 2021

(65) Prior Publication Data
US 2023/0098921 A1    Mar. 30, 2023

Related U.S. Application Data

(60) Provisional application No. 62/950,772, filed on Dec. 19, 2019.

(51) Int. Cl.
| | | |
|---|---|---|
| *C08L 23/16* | (2006.01) | |
| *C07B 41/00* | (2006.01) | |
| *C08L 23/0807* | (2025.01) | |
| *C08L 23/30* | (2006.01) | |

(52) U.S. Cl.
CPC .............. *C08L 23/16* (2013.01); *C07B 41/00* (2013.01); *C08L 23/0815* (2013.01); *C08L 23/30* (2013.01)

(58) Field of Classification Search
CPC ...... C08L 23/04; C08L 23/06; C08L 23/0815; C08L 23/10; C08L 23/14; C08L 23/16; C08L 23/26; C08L 23/30; C08F 210/06; C08F 8/06
See application file for complete search history.

(56) References Cited

U.S. PATENT DOCUMENTS

| | | |
|---|---|---|
| 3,338,992 A | 8/1967 | Allison |
| 3,341,394 A | 9/1967 | Allison |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,061,694 A | 12/1977 | Castagna |
| 4,340,563 A | 7/1982 | Appel et al. |
| 4,540,753 A | 9/1985 | Cozewith et al. |
| 6,268,203 B1 | 7/2001 | Johnson et al. |
| 6,525,157 B2 | 2/2003 | Cozewith et al. |
| 6,881,800 B2 | 4/2005 | Friedersdorf |
| 7,867,433 B2 | 1/2011 | Jacob |
| 8,431,065 B2 | 4/2013 | Jacob |
| 10,059,081 B2 | 8/2018 | Gallez et al. |
| 2011/0021710 A1* | 1/2011 | Jacob ................... C08J 3/247 525/263 |
| 2016/0082690 A1 | 3/2016 | Gallez et al. |

FOREIGN PATENT DOCUMENTS

EP      1161492 A1    12/2001

OTHER PUBLICATIONS

PCT/US2020/064847 International search report and written opinion dated Mar. 23, 2021.
Cheng, Tacticity Index, "C NMR Analysis of Ethylene-Propylene Rubbers1", Macromolecules, 1984, v. 17, p. 1950.
Ver Strate et al., "Near Monodisperse Ethylene", Macromolecules, 1988, v. 21, pp. 3360-3371.
Wheeler et al., "Gel Permeation Chromatography/Fourier Transform Ibfrared Interface for Polymer Analysis", Applied Spectroscopy, 1993, v. 47, pp. 1128-1130.

* cited by examiner

*Primary Examiner* — Jeffrey S Lenihan
(74) *Attorney, Agent, or Firm* — ExxonMobil Technology and Engineering Company

(57) ABSTRACT

A composition comprising a $C_2$-$C_{12}$ polyalphaolefin and a functionalized propylene-based elastomer comprising from about 4 to about 25 wt % units derived from one or more $C_2$ or $C_4$-$C_{12}$ alpha-olefins; a triad tacticity greater than about 90%; a heat of fusion less than about 75 J/g; and a plurality of oxygen containing functional groups selected from carboxylic acids, anhydrides, ketones, carbonates, esters, ethers, lactones, and combinations thereof. Compositions containing the functionalized propylene-based elastomer and methods to produce the same are also disclosed.

20 Claims, 2 Drawing Sheets ns derived from one or more $C_2$ or $C_4$-$C_{12}$ alpha-olefins;
FUNCTIONALIZED PROPYLENE BASED ELASTOMER COMPOSITION AND METHOD OF MAKING

CROSS-REFERENCE TO RELATED APPLICATIONS

This application is a U.S. national phase application of PCT Application No. PCT/US2020/064847 having a filing date of Dec. 14, 2020, which claims priority to and the benefit of U.S. Provisional Application No. 62/950,772 having a filing date of Dec. 19, 2019, and EP Application Serial No. 20164145.3, filed Mar. 19, 2020, the contents of both each are incorporated by reference in their entirety.

FIELD

This invention relates to compositions comprising a $C_2$-$C_{12}$ polyalphaolefin and a functionalized propylene-based elastomer.

BACKGROUND OF THE INVENTION

Polypropylene is conventionally used to produce fibers and spunbond nonwovens for a wide range of articles, such as, for example, disposable hygiene goods including diapers, sanitary napkins, training pants, adult incontinence products, hospital gowns, baby wipes, moist towelettes, cleaner cloths, and the like. The typical polypropylene nonwoven fabric can mimic the appearance, texture and strength of a woven fabric. In combination with other materials they provide a spectrum of products with diverse properties, and are also used alone or as components of apparel, home furnishings, health care, engineering, industrial and consumer goods.

However, polypropylene and other polyalphaolefins are typically hydrophobic. Various end uses require fabrics having hydrophilic properties. Polyalphaolefin fabrics may be imparted with hydrophilic properties through post reactor processes, such as via grafting of the polyalphaolefin with polar moieties. Such processes add significant cost and complexity to the process. In addition, polyalphaolefins fabrics do not typically have levels of flexibility and softness suitable to for more demanding applications. There is need in the art for polyalphaolefins fabric, e.g., spunbond and others, having hydrophilic properties and other tactile attributes.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

It has been discovered that a propylene-based elastomer may be functionalized to impart polar functional groups and hydrophilicity by exposing the material to oxygen above the melt temperature of the elastomer for a sufficient period of time. It has been further discovered that such functionalization does not greatly affect the rheological properties of the material, and that the functionalized propylene-based elastomer forms melt-blend compositions with polyalphaolefins having improved properties.

In one or more embodiments, a composition comprises a $C_2$-$C_{12}$ polyalphaolefin and a functionalized propylene-based elastomer comprising from about 4 to about 25 wt % units derived from one or more $C_2$ or $C_4$-$C_{12}$ alpha-olefins; a triad tacticity greater than about 90%; a heat of fusion less than about 75 J/g; and a plurality of oxygen containing functional groups selected from carboxylic acids, anhydrides, ketones, carbonates, esters, ethers, lactones, and combinations thereof.

In other embodiments, a method comprises contacting a first propylene-based elastomer with an oxygen containing gas at a temperature greater than or equal to about 200° C. for a period of time sufficient to form a functionalized propylene-based elastomer comprising from about 4 to about 25 wt % units derived from one or more $C_2$ or $C_4$-$C_{12}$ alpha-olefins; a triad tacticity greater than about 90%; a heat of fusion less than about 75 J/g; and greater than about 0.1 wt % of oxygen containing functional groups selected from carboxylic acids, anhydrides, ketones, carbonates, esters, ethers, lactones, and combinations thereof; and melt mixing the functionalized propylene-based elastomer with one or more $C_2$-$C_{12}$ polyalphaolefins to form a blended composition.

In one or more embodiments, the method further includes mixing the first propylene-based elastomer with the polyalphaolefin prior to, or melt mixing simultaneous with contacting of the first propylene-based elastomer with the oxygen containing gas at the temperature greater than or equal to about 200° C. for the period of time sufficient to form the functionalized propylene-based elastomer.

BRIEF DESCRIPTION OF THE DRAWINGS

Embodiments according to the instant application are described with reference to the following figures. The same numbers are used throughout the figures to reference like features and components.

DETAILED DESCRIPTION OF THE INVENTION

Figure 1:
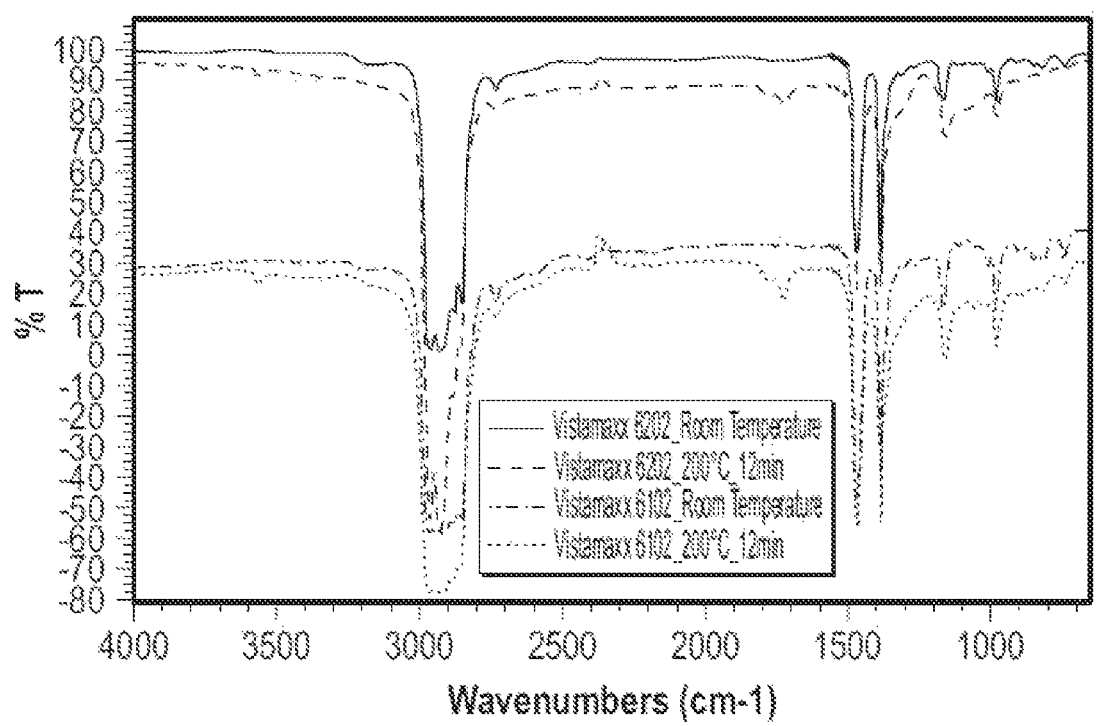
FIG. 1 is a plurality of overlaid FTIR spectra showing a propylene-based elastomer being functionalized by heating in the presence of oxygen to form a functionalized propylene-based elastomer according to embodiments of the disclosure.

A blend comprising a polyalphaolefin and a grafted or otherwise functionalized propylene-based elastomer (f-PBE) are provided herein, as well as methods for forming and articles comprising the same.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context.

Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

For purposes herein, an "olefin," alternatively referred to as "alkene," is a linear, branched, or cyclic compound of carbon and hydrogen having at least one carbon-carbon double bond. For purposes of this specification and the claims appended thereto, when a polymer or copolymer is referred to as including an olefin, the olefin present in such polymer or copolymer is the polymerized form of the olefin. For example, when a copolymer is said to have a "propylene" content of 90 wt % to 95 wt %, it is understood that the mer unit in the copolymer is derived from propylene in the polymerization reaction and said derived units are present at 90 wt % to 95 wt %, based upon the weight of the copolymer. Unless indicated otherwise, a "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers and the like.

For the purposes of the present disclosure, ethylene ("$C_2$") shall be considered an alpha-olefin ($\alpha$-olefin). Accordingly, a polyalphaolefin refers to a polymer comprising a plurality of alpha olefin residues, each having two or more carbon atoms, preferably each olefinic residue has from 2 carbon atoms (ethylene) up to about 12 carbon atoms (dodecene).

As used herein, Mn is number average molecular weight, Mw is weight average molecular weight, and Mz is z average molecular weight, all percentages refer to weight percent unless otherwise indicated, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol. Unless otherwise noted, all melting points (Tm) are determined via DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., $CH_2Ph$), THF is tetrahydrofuran, RT is room temperature (and is 23° C. unless otherwise indicated), tol is toluene, EtOAc is ethyl acetate, Cy is cyclohexyl, Cp is cyclopentadienyl, Cp* is pentamethyl cyclopentadienyl, and Ind is indenyl, PP refers to polypropylene, iPP refers to isotactic polypropylene, CD refers to cyclic diene monomers, HMS-iPP refers to metallocene isotactic polypropylene, which is essentially linear, and the like.

The term "blend" as used herein refers to a mixture of two or more polymers, either homogeneous or heterogeneous. The term "elastomer" shall mean any polymer exhibiting some degree of elasticity, where elasticity is the ability of a material that has been deformed by a force (such as by stretching) to return at least partially to its original dimensions once the force has been removed. A "propylene-based elastomer" is a polymer or copolymer having elastomeric properties which further includes at least 50 mol % propylene derived units. The term melt-blended composition refers to a mixture or blend of two or more components formed under conditions in which at least one of the components was in a liquid or semi-liquid state, e.g., heated above the melting point of the material.

A mixture or blend refers to a combination of two or more components forming a homogeneous "solution", or a dispersion of one of the materials as a discontinuous phase, dispersed in the other material which forms the continuous phase. Unless noted otherwise, the terms "mixture" and "blend" are used interchangeably herein.

The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction.

Unless indicated otherwise, melt flow rate ("MFR") is determined by ASTM method D1238, Condition L (230° C., 2.16 kg).

"Catalyst system" as used herein means the combination of one or more catalysts with one or more activators and, optionally, one or more support compositions. An "activator" is any compound or component, or combination of compounds or components, capable of enhancing the ability of one or more catalysts to polymerize monomers to polymers.

Functional groups refer to replacing of a hydrogen or carbon atom either along the polymer backbone or pendent to the polymer backbone with a moiety comprising one or more hetero atoms. Functional groups include halogen (e.g., Br, Cl, F or I), $—NR^*_2$, $—OR^*$, $—SeR^*$, $—TeR^*$, $—PR^*_2$, $—AsR^*_2$, $—SbR^*_2$, $—SR^*$, $—BR^*_2$, $—SiR^*$, $—SiR^*_3$, $—GeR^*$, $—GeR^*_3$, $—SnR^*$, $—SnR^*_3$, $—PbR^*_3$, wherein R* is either hydrogen, an alkyl radical, or another functional group. For purposes herein, oxygen containing functional groups include carboxylic acids (and salts thereof), anhydrides, ketones, carbonates (—O—CO—O—), esters, ethers, lactones, and combinations thereof.

As is commonly understood in the art, precise quantification of the wt % of oxygen imparted to the functionalized elastomer is difficult to obtain, and impossible to obtain when combined with another oxygen containing polymer. For purposes herein, an FTIR method is utilized. As is known, FTIR does not provide absolute concentration in complex systems such as polymers. Instead, the peak height and/or corresponding peak area of representative absorption peak(s) in the infrared spectrum is given. In such a complex system as disclosed herein, the polymeric material may contain any number of possible oxidation products, such as ketones, lactones, esters and the like, a single representative absorption must be selected. Accordingly, analytical methods which are typically used to calibrate FTIR results on more defined and less complex systems cannot be employed. This is similar to other such methods including NMR, titration, and the like. It is to be understood that an absolute calibration or correlation between IR peak area/height and concentration of substances is of limited precision and accuracy as is commonly understood in the art. However, such methods do allow for accurate qualitative comparison of oxygen functionalization between examples prepared, treated, and analyzed in the same way.

For purposes herein, a quantitative method originally developed to calculate maleic acid concentration on a grafted elastomeric polymer similar to those utilized herein, has been modified to determine the weight percent oxygen concentration and thus, the amount of functionalization referred to in the instant disclosure and recited in the claims. For purposes herein, a calibration curve is established which correlates a ratio of the peak heights of carbonyl absorptions divided by the peak height of an absorption indicative of the amount of polymer present. This ratio is determined using propylene-based elastomers having known maleic acid concentrations. This correlation (response factor) is then compared to samples of functionalized propylene based elastomers according to the instant disclosure to determine a theoretical maleic acid concentration, which is then converted into a wt % oxygen present based on the relative molecular weight of maleic acid and oxygen.

The method to determine the concentration of maleic acid grafted onto a similar polymer correlated a ratio of absorption representative of the carbonyl moieties to the known values of maleic acid grafted onto the polymers. The maleic acid method first determined a ratio of the area of the carbonyl absorption peaks at ~1,710 $cm^{-1}$ and ~1,780 $cm^{-1}$ (representative of the carbonyl moieties), divided by the area of the peak at 4,352 $cm^{-1}$ (near IR, representative of the C—H stretch and thus the amount of the polymer present in the sample). The calibration was established according to (Ratio=(Peak1710+Peak1780)/Peak4352) vs. the weight percent of maleic acid (MA wt %) determined by other means. In the present disclosure, the carbonyl absorptions utilized in the calibration are similar to those observed in maleic acid grafted polymers. For purposes herein, a calibration table was prepared using maleic acid grafted polymers of known maleic acid concentration using the maximum peak height of carbonyl species in the region of at ~1,710 $cm^{-1}$ and ~1,780 $cm^{-1}$, which were then divided by the peak height of the absorption at 2,723 $cm^{-1}$ (=C—H stretch) to normalize the amount of functionalization to the amount of polymer present. This ratio obtained was then correlated to concentrations of maleic acid in known maleic acid grafted polymers. This calibration was then utilized for the instant samples to determine a theoretical maleic acid concentration, which was then corrected for oxygen concentration (i.e. wt % oxygen functionalization is equal to the theoretical wt % maleic acid as determined by the modified calibration curve, multiplied by the molecular weight of oxygen (16 g/mol) and divided by the molecular weight of maleic acid (mw 116 g/mol).

For purposes herein, an oxygen containing gas is defined as any gas comprising diatomic oxygen, i.e., $O_2$. Accordingly, for purposes herein, air is an oxygen containing gas but carbon dioxide $CO_2$ is not an oxygen containing gas.

In one or more embodiments, a composition comprises blend, i.e., a melt blend, of a polyalphaolefin and a functionalized propylene-based elastomer comprising from about 4 to about 25 wt % units derived from one or more $C_2$ or $C_4$-$C_{12}$ alpha-olefins; a triad tacticity greater than about 90%; a heat of fusion less than about 75 J/g; and a plurality of oxygen containing functional groups selected from carboxylic acids, anhydrides, ketones, carbonates, esters, ethers, lactones, and combinations thereof.

In one or more embodiments, the functionalized propylene-based elastomer comprises from about 0.01 wt % to about 10 wt % oxygen, preferably from about 0.1 wt % to 5 wt % oxygen, based on the total amount of the functionalized propylene-based elastomer present. In one or more embodiments, the functionalized propylene-based elastomer comprises an MFR greater than or equal to about 20, when determined according to ASTM D-1238 (condition L, i.e., 2.16 kg weight @ 230° C.). In some embodiments, the functionalized propylene-based elastomer comprises ethylene, preferably the functionalized propylene-based elastomer comprises greater than or equal to about 10 wt % ethylene, based on the total amount of the functionalized propylene-based elastomer present.

In one or more embodiments, the melt blended composition has a static water contact angle of less than 90°, preferably less than 85°, preferable less than 82°, when determined according to ASTM D7490, or an equivalent thereof.

In one or more embodiments, the functionalized propylene-based elastomer is a reaction product of an oxygen containing gas, typically air, and a first propylene-based elastomer comprising from about 4 to about 25 wt % of units derived from one or more $C_2$ or $C_4$-$C_{12}$ alpha-olefins and having a triad tacticity greater than about 90% and a heat of fusion less than about 75 J/g, when the first propylene-based elastomer is contacted with oxygen at a temperature above about 200° C. and less than or equal to about 260° C., for a period of time greater than about 1 minute, preferably from about 2 minutes to about 20 minutes.

For purposes herein the $C_2$-$C_{12}$ polyalphaolefin refers to a polyalphaolefin formed from one or more alpha-olefin monomers, each having from 2 carbon atoms up to 12 carbon atoms i.e., ethylene to dodecene. In embodiments, the polyalphaolefin comprises greater than about 50 mol % propylene. In some embodiments, the polyalphaolefin further comprises ethylene, butene, pentene, hexene, 4-methyl-1-pentene, octene, decene, or a combination thereof. In one or more embodiments, the polyalphaolefin is isotactic polypropylene (iPP), and in some embodiments the iPP preferably has an MFR greater than about 30, when determined according to ASTM D-1238 (condition L, i.e., 2.16 kg weight @ 230° C.).

In one or more embodiments, the composition comprises about 10 wt % to about 40 wt % of the functionalized propylene-based elastomer, where in other embodiments the composition comprises from about 70 wt % to about 90 wt % of the functionalized propylene-based elastomer, based on the total amount of the functionalized propylene-based elastomer and the polyalphaolefin present.

In one or more embodiments, a method comprises contacting a first propylene-based elastomer with an oxygen containing gas at a temperature greater than or equal to about 200° C. for a period of time sufficient to form a functionalized propylene-based elastomer comprising from about 4 to about 25 wt % units derived from one or more $C_2$ or $C_4$-$C_{12}$ alpha-olefins; a triad tacticity greater than about 90%; a heat of fusion less than about 75 J/g; and greater than about 0.01 wt % of oxygen containing functional groups, preferably greater than about 0.1 wt % of oxygen containing functional groups, selected from carboxylic acids, anhydrides, ketones, carbonates, esters, ethers, lactones, and combinations thereof; and melt mixing the functionalized propylene-based elastomer with one or more polyalphaolefins to form a blended composition according to one or more embodiments disclosed herein.

In some embodiments of the method, the first propylene-based elastomer is contacted with the oxygen containing gas at a temperature greater than or equal to about 200° C., preferably from greater than or equal to about 230° C. to about 260° C. for a period of time greater than about 5 minutes. In one or more embodiments, the oxygen containing gas is air. In embodiments, the first propylene-based elastomer is contacted with the oxygen containing gas at the temperature greater than or equal to about 200° C. in the absence of an antioxidant and/or an antioxidant package.

In one or more embodiments, the first propylene-based elastomer is mixed with the polyalphaolefin prior to, or melt mixed simultaneous with the reacting or otherwise contacting of the first propylene-based elastomer with the oxygen containing gas at the temperature greater than or equal to about 200° C. for the period of time sufficient to form the functionalized propylene-based elastomer. In other embodiments of the method, the first propylene-based elastomer and the polyalphaolefin are blended together prior to said melt mixing, and fed into an extruder, wherein said contacting of the first propylene-based elastomer with the oxygen containing gas at the temperature greater than or equal to about 200° C. for the period of time sufficient to form the functionalized propylene-based elastomer is conducted.

In one or more embodiments of the invention, an article comprises the blended composition according to one or more embodiments disclosed herein. Accordingly, in one or more embodiments, an article comprise a polyalphaolefin and a functionalized propylene-based elastomer comprising from about 4 to about 25 wt % units derived from one or more $C_2$ or $C_4$-$C_{12}$ alpha-olefins; a triad tacticity greater than about 90%; a heat of fusion less than about 75 J/g; and a plurality of oxygen containing functional groups selected from carboxylic acids, anhydrides, ketones, carbonates, esters, ethers, lactones, and combinations thereof.

In one or more embodiments, the article has a static water contact angle of less than 90°, preferably less than 85°, preferable less than 82°, when determined according to ASTM D7490, or an equivalent thereof. In some embodiments, the article is a nonwoven fabric, a diaper, or a film.

In some embodiments, the functionalized propylene-based elastomer comprises about 4 wt % to 10 wt %, ethylene, preferably from about 4 wt % to about 5 wt %, based on the total amount of the propylene-based elastomer present. In one or more embodiments, the functionalized propylene-based elastomer has a Mn of greater than 50,000 and a Mw/Mn of greater than 2, when determined via GPC. In one or more embodiments, the functionalized propylene-based elastomer further comprises an elastic modulus of greater than about 5 MPa, and/or a stress at yield of greater than about 5 MPa, and/or a strain at break of less than about 10 mm/mm, and/or a stress at break of greater than about 5 MPa, when determined according to ASTM D638, or an equivalent thereof.

In one or more embodiments, the functionalized propylene-based elastomer has or demonstrates a static water contact angle of less than 90°, preferably less than 88°, preferable less than 85°, when determined according to ASTM D7490, or an equivalent thereof. Accordingly, in embodiments the functionalized propylene-based elastomer is hydrophilic, which is in contrast to the same propylene-based elastomer prior to functionalization, which is hydrophobic, i.e., has a static water contact angle of greater than or equal to 90° when determined in the same way.

In one or more embodiments, the functionalized propylene-based elastomer comprises an increased presence of carbonyl functional groups relative to the presence of carbonyl functional groups present in the first (non-functionalized) propylene-based elastomer, if any, as determined by an increase in absorptions in an infrared spectrum from about 1,780 $cm^{-1}$ to about 1,690 $cm^{-1}$ (i.e., carbonyl stretch centered around 1,773 $cm^{-1}$ and 1,719 $cm^{-1}$) of the functionalized propylene-based elastomer relative to absorptions in an infrared spectrum from about 1,780 $cm^{-1}$ to about 1,690 $cm^{-1}$ of the first propylene-based elastomer, when determined using the same method under essentially identical conditions. Optionally, other suitable indicators include an increase in absorptions related to C—O—C and —OH functional groups.

In one or more embodiments, the amount of functionalization of the propylene-based elastomer results in a percent difference of the Mn of the functionalized propylene-based elastomer of less than about 30%, preferably less than about 15%, or less than about 10% of the Mn of the first propylene-based elastomer when determined according to the equation:

$$[(^1Mn-Mn^f)/^1Mn]*100\%;$$

wherein $^1Mn$ is the Mn of the first propylene-based elastomer (PBE) determined by GPC; and $Mn^f$ is the Mn of the functionalized propylene-based elastomer (f-PBE) determined by GPC.

Propylene-Based Elastomers (PBE)

In certain embodiments of the present invention, the compositions comprise propylene-based elastomers ("PBEs"), which have been at least partially grafted or otherwise functionalized via reaction with oxygen to form functionalized propylene-based elastomers ("f-PBEs"). As indicated, suitable PBEs include those comprising propylene and from about 4 to about 25 wt % of one or more comonomers selected from ethylene and/or $C_4$-$C_{12}$ α-olefins. In one or more embodiments, the propylene-based elastomer further comprises a triad tacticity greater than about 90% and a heat of fusion less than about 75 J/g. At least a portion of the PBE is then functionalized via contact with oxygen under conditions sufficient to impart or otherwise modify the PBE to include oxygen containing functional groups. Suitable temperatures at which the PBE is contacted with oxygen to form a functionalized propylene-based elastomer (f-PBE) include temperatures above the melting point of the starting PBE material, preferably at a temperature from about 200° C. to about 300° C. or higher, and suitable times at this temperature are greater than or equal to about 1 minute, typically greater than or equal to 2 minutes. It is to be understood that suitable reaction times required to form the functionalized propylene-based elastomer (f-PBE) may be reduced by increasing the reaction temperature, by utilizing pure oxygen instead of air, and/or by subjecting the PBE to shear, such as by mixing or contacting the melted PBE with oxygen in an extruder.

In embodiments, at least a portion of the functionalized propylene-based elastomer comprises oxygen containing functional groups, either pendent to the polymer backbone or within the polymer backbone. Examples of the oxygen containing functional groups include carboxylic acids, anhydrides, ketones, carbonates, esters, ethers, lactones, and combinations thereof. In one or more embodiments, the α-olefin comonomer units may be derived from ethylene, butene, pentene, hexene, 4-methyl-1-pentene, octene, or decene. The embodiments described below are discussed with reference to ethylene as the α-olefin comonomer, but the embodiments are equally applicable to other copolymers with other α-olefin comonomers. In this regard, the copolymers (elastomers) may simply be referred to as functionalize propylene-based elastomers, and/or with reference to ethylene as the α-olefin, e.g., "functionalized propylene-ethylene elastomers".

In one or more embodiments of the invention, the f-PBE may include at least about 4 wt % ethylene, preferably at least about 5 wt %, at least about 6 wt %, at least about 7 wt %, or at least about 8 wt %, or at least about 9 wt %, or at least about 10 wt %, or at least about 12 wt % ethylene-derived units. In those or other embodiments of the invention, the f-PBE may include up to about 30 wt % ethylene, preferably up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and α-olefin derived units. Stated another way, the f-PBE may include at least about 70 wt %, or at least about 75 wt %, or at least about 80 wt %, or at least about 81 wt % propylene-derived units, or at least about 82 wt % propylene-derived units, or at least about 83 wt % propylene-derived units; and in these or other embodiments of the invention, the f-PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units. In certain embodiments of the invention, the f-PBE may comprise from about 5 to about 25 wt % ethylene-derived units, or from about 9 to about 18 wt % ethylene-derived units.

In embodiments wherein the f-PBE is produced via reaction of the PBE with oxygen, either alone or in-situ with other components, as an at least partially melted blend with the polyalphaolefin. As is disclosed herein, the reaction of PBE with oxygen according to embodiments of the disclosure do not appreciably change the rheological properties and other physical properties such as molecular weight and melting point of the f-PBE, relative to those of the PBE prior to the reaction with oxygen according to the instant disclosure. In one or more embodiments, the amount of grafting and/or functionalization with oxygen present in or on the functionalize propylene-based elastomer (f-PBE) is limited to an amount with does not significantly affect the rheological properties of the f-PBE relative to the PBE prior to reaction with oxygen at elevated temperatures, except those relating to hydrophobicity and other properties associated with the oxygen containing functional groups. Accordingly, unless otherwise indicated, the rheological and other properties of the f-PBE are assumed to be essentially the same, or have a difference as indicated. As discussed herein, most rheological properties vary little, if at all between the PBE and the f-PBE. For example, it has been discovered that the Mn of the f-PBE varies less than about 30%, typically less than about 20%, preferably less than about 15%, or within about 10%, or within about 5% of the Mn of the PBE, even though the material is transformed from being hydrophobic (i.e., having a static contact angle greater than or equal to 90°) to hydrophilic (i.e., having a static contact angle less than 90°).

The f-PBEs of one or more embodiments of the invention are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In one or more embodiments of the invention, the Tm of the f-PBE is less than about 115° C., or less than about 110° C., or less than about 100° C., or less than about 95° C., or less than about 90° C.

In one or more embodiments of the invention, the f-PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. In these or other embodiments of the invention, the f-PBE, has a Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g.

As used within this specification, DSC procedures for determining Tm and Hf include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The f-PBE can have a triad tacticity of three propylene units, as measured by $^{13}$C NMR of 75% or greater, 80% or greater, 85% or greater, 90% or greater, 92% or greater, 95% or greater, or 97% or greater. In one or more embodiments of the invention, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The f-PBE may have a tacticity index ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by Cheng, H. N. (1984) *Macromolecules,* v.17, pg. 1950, incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one or more embodiments of the invention, the f-PBE may have a % crystallinity of from about 0.5% to about 40%, or from about 1% to about 30%, or from about 5% to about 25%, determined according to DSC procedures. Crystallinity may be determined by dividing the Hf of a sample by the Hf of a 100% crystalline polymer, which is assumed to be 189 joules/gram for isotactic polypropylene or 350 joules/gram for polyethylene.

In one or more embodiments of the invention, the f-PBE may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature, which for purposes herein is 25° C., as measured per the ASTM D-792 test method.

In one or more embodiments of the invention, the f-PBE can have a melt index (MI) (ASTM D-1238, 2.16 kg @ 190° C.) of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

In one or more embodiments of the invention, the f-PBE may have a melt flow rate (MFR), as measured according to ASTM D-1238 (condition L, i.e., 2.16 kg weight @ 230° C.) of greater than about 0.5 g/10 min, greater than about 1 g/10 min, or greater than about 2 g/10 min, or greater than about 5 g/10 min, or greater than about 8 g/10 min, or greater than about 10 g/10 min. In the same or other embodiments of the invention, the f-PBE may have an MFR of less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In certain embodiments of the invention, the f-PBE may have an MFR from about 1 to about 100 g/10 min, or from about 2 to about 75 g/10 min, or from about 5 to about 50 g/10 min. Preferably, the f-PBE has MFR from 1 to 100 g/10 min, more preferably from 20 to 50 g/10 min.

In one or more embodiments of the invention, the f-PBE may be a reactor grade polymer. In other embodiments of the invention, the f-PBE may be produced from a PBE polymer which has been "visbroken" after exiting the reactor to increase the MFR, prior to functionalization with oxygen containing functional groups according to the instant disclosure. "Visbreaking" as used herein is a process for reducing the molecular weight of a polymer by subjecting the polymer to chain scission. The visbreaking process also increases the MFR of a polymer and may narrow its molecular weight distribution. However, it is to be understood that visbreaking does not refer to the recited functionalized propylene-based elastomer.

In one or more embodiments of the invention, the f-PBE may have a Mooney viscosity [ML (1+4) @ 125° C.] as determined according to ASTM D-1646, of less than about 100, or less than about 75, or less than about 50, or less than about 30.

In one or more embodiments of the invention, the f-PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l = KMv^\alpha$, K and $\alpha$ are measured values for linear polymers and should be obtained on the same instrument as the one used for the g' index measurement.

In one or more embodiments of the invention, the f-PBE may have a weight average molecular weight (Mw) of from about 50,000 to about 5,000,000 g/mol, or from about 75,000 to about 1,000,000 g/mol, or from about 100,000 to about 500,000 g/mol, or from about 125,000 to about 300,000 g/mol. In the same or other embodiments of the invention, the f-PBE may have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole. In the same or other embodiments of the invention, the f-PBE may have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole. In certain embodiments of the invention, the molecular weight distribution (MWD, equal to Mw/Mn) of the f-PBE may be from about 1 to about 40, or from about 1 to about 15, or from about 1.8 to about 5, or from about 1.8 to about 3.

Techniques for determining the molecular weight (Mn, Mw and Mz) and MWD may be found in U.S. Pat. No. 4,540,753 (Cozewith, Ju and Ver Strate) (which is incorporated by reference herein for purposes of U.S. practices) and references cited therein and in Ver Strate et al. (1988) *Macromolecules*, v.21, pp. 3360-3371, which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

Optionally, the f-PBE may also include one or more dienes. The term "diene" is defined as a hydrocarbon compound that has two unsaturation sites, i.e., a compound having two double bonds connecting carbon atoms. Depending on the context, the term "diene" in this patent refers broadly to either a diene monomer prior to polymerization, e.g., forming part of the polymerization medium, or a diene monomer after polymerization has begun (also referred to as a diene monomer unit or a diene-derived unit). Exemplary dienes suitable for use in the present invention include, but are not limited to, butadiene, pentadiene, hexadiene (e.g., 1,4-hexadiene), heptadiene (e.g., 1,6-heptadiene), octadiene (e.g., 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1,000 g/mol. Examples of straight chain acyclic dienes include, but are not limited to, 1,4-hexadiene and 1,6-octadiene. Examples of branched chain acyclic dienes include, but are not limited to, 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene.

Examples of multi-ring alicyclic fused and bridged ring dienes include, but are not limited to, tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene. In some embodiments of the invention of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In one or more embodiments of the invention, the diene is ENB.

In some embodiments of the invention, the f-PBE may optionally comprise from 0.05 to about 6 wt % diene-derived units. In further embodiments of the invention, the polymer comprises from about 0.1 to about 5.0 wt % diene-derived units, or from about 0.25 to about 3.0 wt % diene-derived units, or from about 0.5 to about 1.5 wt % diene-derived units.

Polymerization of the PBE, which is the material prior to functionalization with oxygen containing functional groups, is conducted by reacting monomers in the presence of a catalyst system at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Further description of exemplary methods and catalyst systems suitable for preparation of the PBEs described herein may be found in U.S. Pat. Nos. 6,881,800 and 10,059,081, which are incorporated by reference herein for purposes of U.S. practice.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer may reduce the crystallinity provided by the crystallization of stereoregular propylene derived sequences to the point where the material lacks strength; too little and the material may be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis (1993) *Applied Spectroscopy*, v.47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4,000 cm-1 is recorded and the monomer weight percent of ethylene can be calculated according to the following equation: Ethylene wt %=82.585−111.987X+30.045$X^2$, where X is the ratio of the peak height at 1,155 $cm^{-1}$ and peak height at either 722 cm-1 or 732 $cm^{-1}$, whichever is higher. For propylene ethylene copolymers having 75 wt % or less propylene content, the comonomer (ethylene) content can be measured using the procedure described in Wheeler and Willis.

Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst may also control the stereoregularity in combination with the comonomer and the polymerization temperature. The PBEs described herein which are subsequently reacted with oxygen at elevated temperatures according to embodiments disclosed herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes of the present invention. Suitable catalyst systems may comprise at least one transition metal compound and at least one activator. However, catalyst systems may also comprise more than one transition metal compound in combination with one or more activators. Such catalyst systems may optionally include impurity scavengers.

The catalyst systems used for producing the PBEs may comprise a metallocene compound, such as a bridged bisindenyl metallocene. The activators used to produce PBEs may comprise a cationic component, and an anionic component, which together form an activator compound, as well as alumoxanes and aluminum alkyls. Also, combinations of two different activators can be used with the same or different metallocene(s). Further, the catalyst systems suitable for use in the present invention may contain, in addition to the transition metal compound and the activator described above, additional activators (co-activators) and/or scavengers. A co-activator is a compound capable of reacting with the transition metal complex, such that when used in combination with an activator, an active catalyst is formed. Scavengers may be used to "clean" the reaction of any poisons that would otherwise react with the catalyst and deactivate it. Further description of catalyst systems used to prepare the PBE may be found in U.S. Pat. No. 10,059,081.

In one or more embodiments of the invention, at least a portion of the propylene based elastomer is functionalized (i.e., grafted with oxygen containing functional groups) by reacting the PBE with an oxygen containing gas at temperatures above the melting point of the PBE to form the functionalized propylene-based elastomer, comprising oxygen containing functional groups; preferably the oxygen containing functional groups are selected from carboxylic acids, anhydrides, ketones, carbonates, esters, ethers, lactones, and combinations thereof, and may be located pendant to the carbon-carbon backbone of the elastomer, e.g., as pendant carboxylic acids, anhydrides, esters, ketones, carbonates, alcohols, ethers, lactones, and the like, and/or at the polymer chain ends, and/or within the backbone of the elastomer forming the continuous molecular chain of the polymer, e.g., esters and ethers, and/or between polymer chains forming ethers, anhydrides, and/or ester linkages between pendant groups of two or more polymer chains. As used herein, the term "functionalized" or "grafting" denotes covalent bonding of oxygen to a polymer chain and/or within the polymer backbone chain of the PBE.

In addition to oxygen containing functional groups, prior to reaction of the PBE with oxygen according to embodiments disclosed herein, the PBE may be first grafted with one or more grafting monomer which may include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxylethyl methacrylate and higher hydroxy-alkyl methacrylates and glycidyl methacrylate.

In one or more embodiments of the invention, the functionalized propylene-based elastomer comprises from about 0.01 wt % to about 10 wt % oxygen, based on the total amount of the functionalized propylene-based elastomer present, more preferably from about 0.1 wt % to about 5 wt %, more preferably from about 0.5 wt % to about 3 wt %; in other embodiments of the invention from about 0.5 wt % to about 5 wt %, more preferably from about 1 wt % to about 3 wt %. In a preferred embodiment the functionalized propylene-based elastomer comprises from about 0.5 wt % to about 3 wt % oxygen, preferably from about 0.7 wt % to about 1.5 wt % oxygen present as oxygen containing functional groups selected from carboxylic acids, anhydrides, ketones, carbonates, esters, ethers, lactones, and combinations thereof.

Suitable propylene based elastomers include Vistamaxx elastomer (ExxonMobil). Such polymers are known to blend well with other polyolefins, but are known to not form cohesive compositions when blended with non-polyolefins due to the lack of polar groups in or pendent to the backbone molecular chain.

Applicants have discovered that by functionalizing propylene based elastomers with polar materials, the functionalized propylene-based elastomers (f-PBE) may be successfully blended with non-polyolefin materials. This is in contrast to well-known processes which include post-processing and reaction with grafting agents, e.g., maleic anhydride and the like, which add significant cost and complexity to such processes. Applicant has discovered that reaction of propylene-based elastomers at elevated temperatures with oxygen according to embodiments disclosed herein results in an effective way is to increase the polarity of the propylene based elastomers, thereby enhancing the properties with respect to blends with other polymers and other properties as disclosed herein.

In one or more embodiments, the propylene-based elastomers are reacted with oxygen (diatomic oxygen) at elevated temperature to produce the functionalized propylene-based elastomers. It has been discovered that the amount of functionalization may also be controlled by proper selection of temperature, reaction time, and polymer composition, among others, to produce the f-PGE. Polarity can be improved after tailored oxidation treatment as polar oxygen containing functional groups, mainly those comprising carbonyl groups, are formed in and/or pendent to the elastomer backbone chain. As a result, an improved interaction is obtained between a previously apolar/unreactive backbone and a polar substance, which results in improved performance of blends with polar polymers or other substances (e.g. fillers, other polymers, organic or inorganic modifiers, and the like).

In one or more embodiments, the functionalized propylene-based elastomer comprises ethylene. In at least one embodiment, the functionalized propylene-based elastomer is produced from a propylene-based elastomer which consists of, or which consists essentially of propylene and ethylene. It has been discovered that propylene-ethylene elastomers having relatively low concentrations of ethylene are oxidized (functionalized) to a greater extent for a given period of time, and/or are oxidized (functionalized) to a greater extent at lower temperatures than propylene-ethylene elastomers having relatively higher concentrations of ethylene. Accordingly, the amount of functionalization required to produce a particular blend, or to produce a material having particular properties such as hydrophilicity or stability in a blend with polar materials, may be tailored by selecting a propylene-ethylene elastomer having an appropriate amount of ethylene for subsequent functionalization according to embodiments disclosed herein.

Likewise, the temperature at which the propylene-based elastomer is functionalized may also be controlled to tailor the polarity of the resultant functionalized propylene-based elastomer. In one or more embodiments, the propylene-based elastomer, preferably the propylene-ethylene elastomer, is contacted with oxygen at a temperature above the melting point of the elastomer to form the functionalized propylene-based elastomer. In one or more embodiments, the propylene-based elastomer, preferably the propylene-ethylene elastomer, is contacted with oxygen (as a gas) at a temperature of greater than or equal to about 200° C., preferably greater than or equal to about 230° C., or greater than or equal to about 250° C., or greater than or equal to about 270° C., or greater than or equal to about 280° C. In one or more embodiments, the propylene-based elastomer, preferably the propylene-ethylene elastomer, is contacted with oxygen a specified temperature above the melting point of the elastomer for a period of time (also referred to herein as a residence time) of greater than or equal to about 1 minute to form the functionalized propylene-based elastomer. In one or more embodiments, the residence time is greater than or equal to about 2 minutes, or greater than or equal to about 5 minutes, or greater than or equal to about 7 minutes, or greater than or equal to about 10 minutes, and less than or equal to about 60 minutes, or less than or equal to about 30 minutes, or less than or equal to about 25 minutes, or less than or equal to about 20 minutes at the specified temperature.

In one or more embodiments, the presence of oxygen containing functional groups on or within the elastomeric chain is observed via an increased presence of carbonyl functional groups relative to the presence of carbonyl functional groups present in the first propylene-based elastomer, if any, as determined by an increase in absorptions in an infrared spectrum from about 1,780 $cm^{-1}$ to about 1,690 $cm^{-1}$ of the functionalized propylene-based elastomer relative to absorptions in an infrared spectrum from about 1,780 $cm^{-1}$ to about 1,690 $cm^{-1}$ of the first propylene-based elastomer, when determined using the same method under essentially identical conditions. Accordingly, the necessary residence time to produce a desired functionalized propylene-based elastomer may be at least partially determined for a particular temperature or temperature range via monitoring the infrared spectrum of a material during heating in air or another oxygen containing gas. However, it is to be noted that applicant has also discovered the amount of shear present during mixing and contacting of the propylene-based elastomer with oxygen to form the functionalized propylene-based elastomer increase the rate of functionalization, thus lowering the necessary residence time indicated by static infrared analysis.

In addition to the indicated carbonyl stretch absorption from about 1,780 $cm^{-1}$ to about 1,690 $cm^{-1}$, other absorptions in the infrared spectrum attributable to carboxylic acids, anhydrides, ketones, carbonates, esters, ethers, and/or lactones may also be monitored to indicate a desired level of functionalization.

In one or more embodiments, the functionalized propylene-based elastomer comprises ethylene, and thus is produced from a corresponding propylene-based elastomer comprising ethylene, which in some embodiments is a propylene-ethylene elastomer. In one or more of such embodiments, ethylene is present in the functionalized propylene-based elastomer at greater than about 4 wt %, or greater than about 5 wt %, or greater than about 6 wt %, or greater than about 7 wt %, or greater than about 8 wt %, and less than or equal to about 10 wt %, or less than or equal to about 9 wt %, based on the total amount of the functionalized propylene-based elastomer present. As such, the functionalized propylene-ethylene elastomer is produced by contacting a corresponding propylene-ethylene elastomer having a corresponding amount of ethylene, i.e., from about 4 wt % to 10 wt %, preferably from about 4 wt % to about 5 wt %, based on the total amount of the propylene-ethylene elastomer present.

To allow functionalization of the propylene-based elastomer to occur, the propylene-based elastomer is contacted with oxygen at the elevated temperature in the absence of any antioxidant or antioxidant package. However, it is to be understood that once the functionalized propylene-based elastomer is produced, any suitable antioxidant or antioxidant package, and/or any other component, may be included with the functionalized propylene-based elastomer or a composition comprising the functionalized propylene-based elastomer. For example, in one embodiment the functionalized propylene-based elastomer is produced and then combined with one or more antioxidants in a subsequent process. In an alternative embodiment, a suitable propylene-based elastomer is contacted with oxygen at a suitable temperature for a suitable period of time, e.g., in an extruder, to produce the functionalized propylene-based elastomer, followed by incorporating one or more antioxidants and/or any other component, into the composition within the same extruder or within the same extrusion or mixing process.

The blends described above may be produced by mixing the elastomers of the invention with one or more polymers (as described above), by connecting reactors together in series to make reactor blends or by using more than one catalyst in the same reactor to produce multiple species of polymer. The polymers can be mixed together prior to being put into the extruder or may be mixed in the extruder while contacting the PGE with oxygen at the elevated temperature to form the f-PGE.

Blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the extruder. Additionally, additives may be included in the blend, in one or more components of the blend, at any point along the formation process, and/or in a product formed from the blend, such as a pellets, masterbatches, films, and/or articles as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

In embodiments, the functionalized propylene-based elastomer may be formed within, or added to other components to form a melt-blended composition. In embodiments, the functionalized propylene-based elastomer is tailored to have a polarity sufficient to produce a stable melt-blended composition comprising a homogeneous mixture of the functionalized propylene-based elastomer and the polyalphaolefin.

The functionalized propylene-based elastomer and blends (melt blended compositions) comprising the functionalized propylene-based elastomer also demonstrate improved surface properties. For example, functionalization of the propylene-based elastomer converts the material from a hydrophobic material, having a static water contact angle of greater than 90° when determined according to ASTM D7490, to a hydrophilic material having a static water contact angle of less than 90°, preferably less than 88°, preferable less than 85°, when determined according to ASTM D7490, or an equivalent thereof. Likewise, melt blended compositions comprising the functionalized propylene-based elastomer become hydrophilic, indicating the presence of the functionalized propylene-based elastomer on the surface of the material.

A variety of additives may be incorporated into the polymer blends described herein, depending upon the intended purpose. For example, when the blends are used to form fibers and woven or knitted fabrics, such additives may include but are not limited to stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium salts such as sodium stearate, sodium ionomers, and plasticizers such as poly(ether ester). Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Further, in some exemplary embodiments, the f-PBE and any additives may be incorporated into the polyalphaolefin blends directly, or as part of a masterbatch, i.e., f-PBE and/or an additive package containing several additives to be added at one time in predetermined proportions may be included. In one or more embodiments herein, the composition of the present invention further comprises a masterbatch. The masterbatch may be added in any suitable amount to accomplish the desired result. For example, a masterbatch comprising one or more additional additives or components may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch.

In any embodiment, the polyalphaolefin-functionalized propylene-based elastomer (PA-f-PBE) blends may be formed into continuous filaments, yarns, and traditional woven or knitted textiles. Conventional fiber operations, including continuous filament and bulk continuous filaments, are useful as a means for producing the fibers of the blends of the present invention. Typically the polyalphaolefin-functionalized propylene-based elastomer blend is dried to less to less than 0.004 wt % moisture before use, and the molten blend is extruded at 280°-285° C., often through a manifold, static mixer, metering pump, and/or spin pack, through a monofilament or multifilament hole die (spinneret) of 0.05 mm to 1 mm in diameter, e.g., 0.3-0.8 mm. Spinnerets typically have 50-250 holes. From the spinneret, the filament often passes through a quench chamber, spin finish applicator, take-up winder, and so on. Filaments are typically 1 to 10 denier, and multifilament yarns are typically 40 to 2,000 denier. In certain embodiments, the fibers may have a thickness from about 1 to about 10 denier, or from about 2 to about 8 denier, or from about 4 to about 6 denier. Spinning speed may be from 500 m/min to 9,000 m/min, but is typically 1,000 m/min to 4,000 m/min. The monofilaments or yarn may be woven or knitted into fabrics or textiles using conventional weaving and knitting equipment and techniques.

In one or more embodiments, the present invention is directed to meltspun (e.g., meltblown or spunbond) fibers and nonwoven compositions (e.g. fabrics) comprising the polymer blends described above. As used herein, "meltspun nonwoven composition" refers to a composition having at least one meltspun layer, and does not require that the entire composition be meltspun or nonwoven. In some embodiments, the nonwoven compositions additionally comprise one or more layers positioned on one or both sides of the nonwoven layer(s) comprising the PA-f-PBE blend. As used herein, "nonwoven" refers to a textile material that has been produced by methods other than weaving. In nonwoven fabrics, the fibers are processed directly into a planar sheet-like fabric structure and then are either bonded chemically, thermally, or interlocked mechanically (or both) to achieve a cohesive fabric.

In some embodiments, the methods further comprise forming a nonwoven composition from the fibers. In further embodiments, the nonwoven composition formed from the polyalphaolefin-functionalized propylene-based elastomer blend is employed as a facing layer, and the process may further comprise the steps of forming one or more nonwoven elastic layers, and disposing the facing layer comprising the polyalphaolefin-functionalized propylene-based elastomer blend upon the elastic layer. Optionally, two or more facing layers may be disposed upon the elastic layer or layers on opposite sides, such that the elastic layers are sandwiched between the facing layers. In one or more embodiments, the elastic layer or layers may comprise a polyalphaolefin-functionalized propylene-based elastomer having the composition and properties described above. In certain embodiments, nonwoven compositions comprising polyalphaolefin-functionalized propylene-based elastomer blends may be described as extensible. "Extensible," as used herein, means any fiber or nonwoven composition that yields or deforms (i.e., stretches) upon application of a force. While many extensible materials are also elastic, the term extensible also encompasses those materials that remain extended or deformed upon removal of the force. When an extensible facing layer is used in combination with an elastic core layer, desirable aesthetic properties may result because the extensible layer permanently deforms when the elastic layer to which it is attached stretches and retracts. This results in a wrinkled or textured outer surface with a soft feel that is particularly suited for articles in which the facing layer is in contact with a wearer's skin.

The fibers and nonwoven compositions of the present invention can be formed by any method known in the art. For example, the nonwoven compositions may be produced by a meltblown or spunbond process. In certain embodiments herein, the layer or layers of the nonwoven compositions of the invention are produced by a spunbond process. When the compositions further comprise one or more elastic layers, the elastic layers may be produced by a meltblown process, by a spunbond or spunlace process, or by any other suitable nonwoven process.

As used herein, "meltblown fibers" and "meltblown compositions" (or "meltblown fabrics") refer to fibers formed by extruding a molten thermoplastic material at a certain processing temperature through a plurality of fine, usually circular, die capillaries as molten threads or filaments into high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. Nos. 3,849,241 and 6,268,203. Meltblown fibers are microfibers that are either continuous or discontinuous, and, depending on the resin, may be smaller than about 10 microns, or certain high throughput processes such as those described herein, meltblown fibers may have diameters greater than 10 microns, such as from about 10 to about 30 microns, or about 10 to about 15 microns. The term meltblowing as used herein is meant to encompass the meltspray process.

Commercial meltblown processes utilize extrusion systems having a relatively high throughput, in excess of 0.3 grams per hole per minute ("ghm"), or in excess of 0.4 ghm, or in excess of 0.5 ghm, or in excess of 0.6 ghm, or in excess of 0.7 ghm. The nonwoven compositions of the present invention may be produced using commercial meltblown processes, preferably a high pressure meltblown process available from Biax-Fiberfilm Corporation, or in test or pilot scale processes. In one or more embodiments of the present invention, the fibers used to form the nonwoven compositions are formed using an extrusion system having a throughput rate of from about 0.01 to about 3.0 ghm, or from about 0.1 to about 2.0 ghm, or from about 0.3 to about 1.0 ghm.

In a typical spunbond process, polymer is supplied to a heated extruder to melt and homogenize the polymers. The extruder supplies melted polymer to a spinneret where the polymer is fiberized as passed through fine openings arranged in one or more rows in the spinneret, forming a curtain of filaments. The filaments are usually quenched with air at a low temperature, drawn, usually pneumatically, and deposited on a moving mat, belt or "forming wire" to form the nonwoven composition. See, for example, in U.S. Pat. Nos. 4,340,563; 3,692,618; 3,802,817; 3,338,992; 3,341,394; 3,502,763; and 3,542,615. The term spunbond as used herein is meant to include spunlace processes, in which the filaments are entangled to form a web using high-speed jets of water (known as "hydroentanglement").

The fibers produced in the spunbond process are usually in the range of from about 10 to about 50 microns in diameter, depending on process conditions and the desired end use for the fabrics to be produced from such fibers. For example, increasing the polymer molecular weight or decreasing the processing temperature results in larger diameter fibers. Changes in the quench air temperature and pneumatic draw pressure also have an effect on fiber diameter.

The nonwoven compositions described herein may be a single layer, or may be multilayer laminates. One application is to make a laminate (or "composite") from meltblown ("M") and spunbond ("S") nonwoven compositions, which combines the advantages of strength from the spunbonded component and greater barrier properties of the meltblown component. A typical laminate or composite has three or more layers, a meltblown layer(s) sandwiched between two or more spunbonded layers, or "SMS" nonwoven composites. Examples of other combinations are SSMMSS, SMMS, and SMMSS composites. Composites can also be made of the meltblown or spunbond nonwovens of the invention with other materials, either synthetic or natural, to produce useful articles.

The nonwoven products described above may be used in many articles such as hygiene products including, but not limited to, diapers, feminine care products, and adult incontinent products. The nonwoven products may also be used in medical products such as sterile wrap, isolation gowns, operating room gowns, surgical gowns, surgical drapes, first aid dressings, and other disposable items.

Having described the various aspects of the compositions herein, further specific embodiments of the invention include those set forth in the following paragraphs:

A1. A composition comprising:
  i) a $C_2$-$C_{12}$ polyalphaolefin; and
  ii) a functionalized propylene-based elastomer comprising from about 4 to about 25 wt % units derived from one or more $C_2$ or $C_4$-$C_{12}$ alpha-olefins;
  a triad tacticity greater than about 90%;
  a heat of fusion less than about 75 J/g; and
  a plurality of oxygen containing functional groups selected from carboxylic acids, anhydrides, ketones, carbonates, esters, ethers, lactones, and combinations thereof.

A2. The composition according to embodiment A1, wherein the functionalized propylene-based elastomer comprises from about 0.01 wt % to about 10 wt % oxygen, preferably from about 0.1 wt % to 5 wt % oxygen, based on the total amount of the functionalized propylene-based elastomer present.

A3. The composition according to embodiments A1 or A2, wherein the functionalized propylene-based elastomer comprises an MFR greater than or equal to about 20, when determined according to ASTM D-1238 (condition L, i.e., 2.16 kg weight @ 230° C.).

A4. The composition according to any one of embodiments A1 through A3, wherein the functionalized propylene-based elastomer comprises ethylene.

A5. The composition according to embodiment A4, wherein the functionalized propylene-based elastomer comprises greater than or equal to about 10 wt % ethylene, based on the total amount of the functionalized propylene-based elastomer present.

A6. The composition according to any one of embodiments A1 through A5, having a static water contact angle of less than 90°, preferably less than 85°, preferable less than 82°, when determined according to ASTM D7490, or an equivalent thereof.

A7. The composition according to any one of embodiments A1 through A6, wherein the functionalized propylene-based elastomer is a reaction product of:
  i) a diatomic oxygen containing gas; and
  ii) a first propylene-based elastomer comprising from about 4 to about 25 wt % of units derived from one or more $C_2$ or $C_4$-$C_{12}$ alpha-olefins and having a triad tacticity greater than about 90% and a heat of fusion less than about 75 J/g,
  when contacted at a temperature above about 200° C. and less than or equal to about 260° C., for a period of time greater than about 1 minute, preferably from about 2 minutes to about 20 minutes.

A8. The composition according to embodiment A7, wherein the percent difference of the Mn of the functionalized propylene-based elastomer is less than 30%, preferably less than about 15% or less than about 10% of the Mn of the first propylene-based elastomer when determined according to the equation:

$$[(^1Mn - Mn^f)/{}^1Mn]*100\%;$$

wherein $^1Mn$ is the Mn of the first propylene-based elastomer determined by GPC; and
  $Mn^f$ is the Mn of the functionalized propylene-based elastomer determined by GPC.

A9. The composition according to any one of embodiments A1 through A8, wherein the functionalized propylene-based elastomer comprises an increased presence of carbonyl functional groups relative to the presence of carbonyl functional groups present in the first propylene-based elastomer, if any, as determined by an increase in absorptions in an infrared spectrum from about 1,780 $cm^{-1}$ to about 1,690 $cm^{-1}$ of the functionalized propylene-based elastomer relative to absorptions in an infrared spectrum from about 1,780 $cm^{-1}$ to about 1,690 $cm^{-1}$ of the first propylene-based elastomer, when determined using the same method under essentially identical conditions.

A10. The composition according to any one of embodiments A1 through A9, wherein the $C_2$-$C_{12}$ polyalphaolefin comprises greater than about 50 mol % propylene, preferably isotactic polypropylene homopolymer.

A11. The composition according to embodiment A10, wherein the polyalphaolefin further comprises ethylene, butene, pentene, hexene, 4-methyl-1-pentene, octene, decene, or a combination thereof.

A12. The composition according to any one of embodiments A1 through A11, wherein the polyalphaolefin is isotactic polypropylene having an MFR greater than about 30, when determined according to ASTM D-1238 (condition L, i.e., 2.16 kg weight @ 230° C.).

A13. The composition according to any one of embodiments A1 through A12, comprising from about 10 wt % to about 40 wt % of the functionalized propylene-based elastomer, based on the total amount of the functionalized propylene-based elastomer and the polyalphaolefin present.

A14. The composition according to any one of embodiments A1 through A12, comprising from about 70 wt % to about 90 wt % of the functionalized propylene-based elastomer, based on the total amount of the functionalized propylene-based elastomer and the polyalphaolefin present.

A15. The composition according to any one of embodiments A1 through A14, wherein the functionalized propylene-based elastomer comprises ethylene, and the ethylene is present from about 4 wt % to 10 wt %, based on the total amount of the functionalized propylene-based elastomer present.

A16. The composition according to any one of embodiments A1 through A15, wherein the functionalized propylene-based elastomer has an Mn of greater than 50,000 and a Mw/Mn of greater than 2, when determined via GPC.

A17. The composition according to any one of embodiments A1 through A16, wherein the functionalized propylene-based elastomer has an elastic modulus of greater than about 5 MPa when determined according to ASTM D638, or an equivalent thereof.

A18. The composition according to any one of embodiments A1 through A17, wherein the functionalized propylene-based elastomer has a strain at break of less than about 10 mm/mm when determined according to ASTM D638, or an equivalent thereof.

A19. The composition according to any one of embodiments A1 through A18, wherein the functionalized propylene-based elastomer has a stress at yield of greater than about 5 MPa, when determined according to ASTM D638, or an equivalent thereof.

A20. The composition according to any one of embodiments A1 through A19, wherein the functionalized propylene-based elastomer has a stress at break of greater than about 5 MPa, when determined according to ASTM D638, or an equivalent thereof.

A21. A method comprising:
contacting a first propylene-based elastomer with an oxygen containing gas at a temperature greater than or equal to about 200° C. for a period of time sufficient to form a functionalized propylene-based elastomer comprising from about 4 to about 25 wt % units derived from one or more $C_2$ or $C_4$-$C_{12}$ alpha-olefins;
a triad tacticity greater than about 90%;
a heat of fusion less than about 75 J/g; and
greater than about 0.1 wt % of oxygen containing functional groups selected from carboxylic acids, anhydrides, ketones, carbonates, esters, ethers, lactones, and combinations thereof; and
melt mixing the functionalized propylene-based elastomer with one or more $C_2$-$C_{12}$ polyalphaolefins to form a blended composition according to any one of embodiments A1 through A20.

A22. A method comprising:
contacting a first propylene-based elastomer with an oxygen containing gas at a temperature greater than or equal to about 200° C. for a period of time sufficient to form a functionalized propylene-based elastomer comprising from about 4 to about 25 wt % units derived from one or more $C_2$ or $C_4$-$C_{12}$ alpha-olefins;
a triad tacticity greater than about 90%;
a heat of fusion less than about 75 J/g; and
greater than about 0.1 wt % of oxygen containing functional groups selected from carboxylic acids, anhydrides, ketones, carbonates, esters, ethers, lactones, and combinations thereof; and
melt mixing the functionalized propylene-based elastomer with one or more $C_2$-$C_{12}$ polyalphaolefins to form a blended composition.

A23. The method according to any one of embodiments A21 or A22, wherein the first propylene-based elastomer is contacted with the oxygen containing gas at a temperature from about 230° C. to about 260° C. for a period of time greater than about 5 minutes.

A24. The method according to any one of embodiments A21 through A23, wherein the oxygen containing gas is air.

A25. The method according to any one of embodiments A21 through A24, wherein the first propylene-based elastomer is contacted with the oxygen containing gas at the temperature greater than or equal to about 200° C. in the absence of an antioxidant and/or an antioxidant package.

A26. The method according to any one of embodiments A21 through A25, wherein the first propylene-based elastomer comprises greater than about 10 wt % ethylene, based on the total amount of the first propylene-based elastomer present.

A27. The method according to any one of embodiments A21 through A26, wherein the blended composition comprises from about 10 wt % to about 40 wt % of the functionalized propylene-based elastomer, based on the total amount of functionalized propylene-based elastomer and polyalphaolefin present.

A28. The method according to any one of embodiments A21 through A27, wherein the blended composition comprises from about 70 wt % to about 90 wt % of the functionalized propylene-based elastomer, based on the total amount of functionalized propylene-based elastomer and polyalphaolefin present.

A29. The method according to any one of embodiments A21 through A28, wherein the first propylene-based elastomer is mixed with the polyalphaolefin prior to, or melt mixed simultaneous with said contacting of the first propylene-based elastomer with the oxygen containing gas at the temperature greater than or equal to about 200° C. for the period of time sufficient to form the functionalized propylene-based elastomer.

A30. The method according to any one of embodiments A21 through A29, wherein the first propylene-based elastomer and the polyalphaolefin are blended together prior to said melt mixing, and fed into an extruder, wherein said contacting of the first propylene-based elastomer with the oxygen containing gas at the temperature greater than or equal to about 200° C. for the period of time sufficient to form the functionalized propylene-based elastomer is conducted.

A31. The method according to any one of embodiments A21 through A30, wherein the polyalphaolefin further comprises ethylene, butene, pentene, hexene, 4-methyl-1-pentene, octene, decene, or a combination thereof.

A32. The method according to any one of embodiments A21 through A31, wherein the polyalphaolefin is isotactic polypropylene, preferably isotactic polypropylene having an MFR greater than about 30, when determined according to ASTM D-1238 (condition L, i.e., 2.16 kg weight @ 230° C.).

A33. The method according to any one of embodiments A21 through A32, wherein the blended composition has a static water contact angle of less than 90°, preferably less than 85°, preferable less than 82°, when determined according to ASTM D7490, or an equivalent thereof.

A34. An article comprising a composition according to any one of embodiments A1 through A20.

A35. An article comprising:
  i) a $C_2$-$C_{12}$ polyalphaolefin; and
  ii) a functionalized propylene-based elastomer comprising from about 4 to about 25 wt % units derived from one or more $C_2$ or $C_4$-$C_{12}$ alpha-olefins;
  a triad tacticity greater than about 90%;
  a heat of fusion less than about 75 J/g; and
  a plurality of oxygen containing functional groups selected from carboxylic acids, anhydrides, ketones, carbonates, esters, ethers, lactones, and combinations thereof.

A36. The article according to embodiment A34 or A35, having a static water contact angle of less than 90°, preferably less than 85°, preferable less than 82°, when determined according to ASTM D7490, or an equivalent thereof.

A37. The article according to any one of embodiments A34 through A36, wherein the article comprises a nonwoven fabric, a diaper, or a film.

Examples

The following examples are used to further illustrate various embodiments disclosed herein.

The amount of functionalization in terms of the wt % oxygen present within the propylene-based functionalized elastomer was determined using a calibration curve obtained by correlating a ratio of absorption representative of the carbonyl moieties to the known values of maleic acid grafted onto the polymers. For purposes herein, maleic acid grafted propylene based elastomers having known amounts of maleic acid incorporation were analyzed as thin films via FTIR to determine a ratio of the peak height of the carbonyl absorption peaks at ~1,710 cm$^{-1}$ and ~1,780 cm$^{-1}$ (representative of the carbonyl moieties), divided by the area of the peak at the peak height of the absorption at 2,723 cm$^{-1}$ (=C—H stretch) to normalize the amount of carbonyl functionalization to the amount of polymer present. This ratio was then correlated to the known concentrations of maleic acid present in the maleic acid grafted propylene-based elastomers. Samples of the functionalized propylene-based elastomers were then analyzed via FTIR and the above ratio determined. This ratio was then utilized to determine a theoretical amount of maleic acid grafting. This theoretical amount of maleic acid grafting was then converted into the wt % oxygen functionalization based on the ratio of the molecular weight of maleic acid to oxygen. Accordingly, wt % oxygen functionalization is equal to the theoretical wt % maleic acid as determined by the modified calibration curve, multiplied by the ratio of moles of moles of oxygen (mw 16 g/mol) divided by the moles of maleic acid (mw 116 g/mol).

Using this method, the maximum concentration in a period of 20 minutes at 200° C. functionalization of the propylene-based elastomer results in a theoretical maleic acid concentration range of about 4-8 wt % maleic acid. Conversion of this range translates into a functionalized propylene-based elastomer having from about 0.5 wt % to about 1.2 wt % oxygen.

For purposes herein, molecular weight is determined using the following GPC 4D procedure. The distribution and the moments of molecular weight ($M_w$, $M_n$, $M_w/M_n$, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 ml added TCB solvent. The polymer is dissolved at 160° C. with continuous shaking for about 1 hour for PE samples or 2 hour for PP samples. The TCB densities used in concentration calculation are 1.463 g/ml at about 23° C. temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log (K_{PS}/K)}{a+1} + \frac{a_{PS}+1}{a+1} \log M_{PS},$$

where the variables with subscript "PS" stand for polystyrene while those without a subscript are for the test samples. In this method, $\alpha_{PS}$=0.67 and $K_{PS}$=0.000175 while α and K are for other materials as calculated and published in literature (Sun, T. et al. (2001) *Macromolecules*, v.34, pp. 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end. The wt % comonomer is then obtained from the following expression in which f is 0.3, 0.4, 0.6, 0.8, and so on for $C_3$, $C_4$, $C_6$, $C_8$, and so on co-monomers, respectively:

$$w2 = f * SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1,000TC (bulk CH3end/1000TC) is obtained by weight-averaging the chain-end correction over the molecular-weight range. Then $$w2b = f * \text{bulk } CH3/1000TC$$

$$\text{bulk } SCB/1000TC = \text{bulk } CH3/1000TC - \text{bulk } \frac{CH3 \text{ end}}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, A2 is the second virial coefficient, $P(\theta)$ is the form factor for a monodisperse random coil, and Ko is the optical constant for the system:

$$K_o = \frac{4\pi^2 n^2 (dn/dc)^2}{\lambda^4 N_A},$$

where NA is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and A2=0.0015; for analyzing ethylene-butene copolymers, dn/dc=0.1048*(1-0.00126*w2) ml/mg and A2=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity, $[\eta]$, at each point in the chromatogram is calculated from the equation $[\eta]=\eta s/$c, where c is concentration and is determined from the IR5 broadband channel output. The viscosity MW at each point is calculated as $$M = K_{ps} M^{\alpha_{ps}+1}/[\eta], \text{ where } \alpha_{ps} \text{ is 0.67 and } K_{ps} \text{ is } 0.000175.$$

Tensile properties were obtained according to ASTM D638 according to standard laboratory procedures.

Rheological data were acquired under a nitrogen atmosphere using a dynamic mechanical spectrometer obtained from Advanced Rheometrics Expansion System (ARES).

Propylene-based elastomers do not typically form compatible blends with more polar materials. The propylene-based elastomer marketed under the name Vistamaxx® by ExxonMobil may be functionalized with oxygen containing functional groups such that it forms compatible blends with non-polyolefin materials. As these examples show, a new and novel functionalized propylene-based elastomer having increased polarities is formed by contacting the propylene-based elastomer with oxygen, typically air, at a temperature above the melting point of the propylene-based elastomer to produce the functionalized propylene-based elastomer. As these examples further show, these new molecules generated by oxidation treatment during processing allow for the polarity to not only be improved, but further allow for a tailored oxidation treatment as polar functional carbonyl groups are formed in the chains.

As the following data confirm, these functionalized propylene-based elastomers exhibit excellent binding characteristics with polar materials, while maintaining the elastomeric properties of the apolar unreactive backbone provided by the elastomers.

In addition, these improved properties may be obtained in melt blends with polar polymers and/or other substances (e.g. filler or organic filler). It has further been discovered that the functionalized propylene-based elastomer also affects the surface properties of blends, which allow for surface properties to be changed during formation of the blends.

Typically, during compounding applications, elevated temperatures result in chain scission, which typically diminishes the properties of the material. In contrast to what is expected, it has been discovered that intentionally increasing the processing temperatures while compounding the subject propylene-based elastomers in the presence of oxygen, results in oxidation tailored treatment.

Table 1 lists the MFR and wt % ethylene of the propylene-based elastomers utilized in the following examples.

TABLE 1

| PBE | MFR | WT % ETHYLENE |
|---|---|---|
| VM6102 | 3 | 16 |
| VM6202 | 20 | 15 |
| VM3980 | 8 | 9 |
| VM3588 | 8 | 4 |
| VM6502 | 48 | 13 |
| VM7020 | 20 | 17 |
| VM7050 | 48 | 13 |

Two samples of the PBE were evaluated for oxidative functionalization. Samples of VM 6201 and VM 6202 were prepared for FTIR analysis and observed over a 30 minute period of time while heated at 200° C. on a hot-air stage of an FT-IR microscope in air. The resultant infrared spectra are shown in FIG. 1. As the figure shows, absorptions attributable to carbonyl compounds gradually appear in the region from 1,773 $cm^{-1}$ to 1,719 $cm^{-1}$, and from 1,080 $cm^{-1}$ to 1,000 $cm^{-1}$ upon heating. These absorptions are assigned to the different carbonyl group stretching in the functionalized propylene-based elastomers according to the following:

| Absorption (Cm-1) | Assignment | Description |
|---|---|---|
| 1719 | C=O ketone | C=O stretching of ketone |
| 1773 | C=O lactone/anhydride | C=O stretching of lactone/anhydride |

Therefore, the method to improve the polarity is to increase temperature above 200° C. in the presence of oxygen without any additional anti-oxidant during the compounding process. The degree of polarity is related to the relative proportion of carbonyl groups and/or other oxygen-containing functional groups produced on or within the polymer. The relative wt % of oxygen incorporated into the functionalized propylene-based elastomer is shown to depend on both temperature and reaction time.

Figure 2:
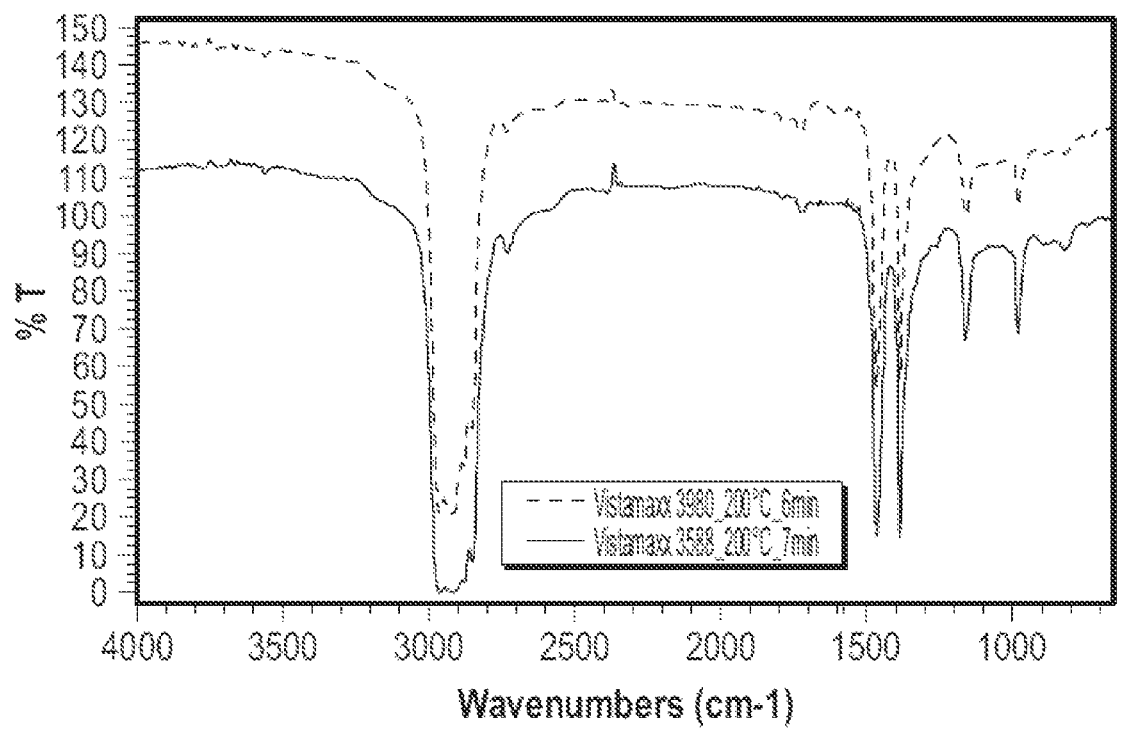
FIG. 2 is a plurality of overlaid FTIR spectra showing another propylene-based elastomer being functionalized by heating in the presence of oxygen to form a functionalized propylene-based elastomer according to embodiments of the disclosure.

FIG. 2 shows the effects of heating two different samples of propylene-based elastomers having lower ethylene content than those shown in FIG. 1. As these data confirm, the propylene-based elastomers having lower ethylene content achieve functionalization in less time than those having higher ethylene concentrations.

Figure 3:
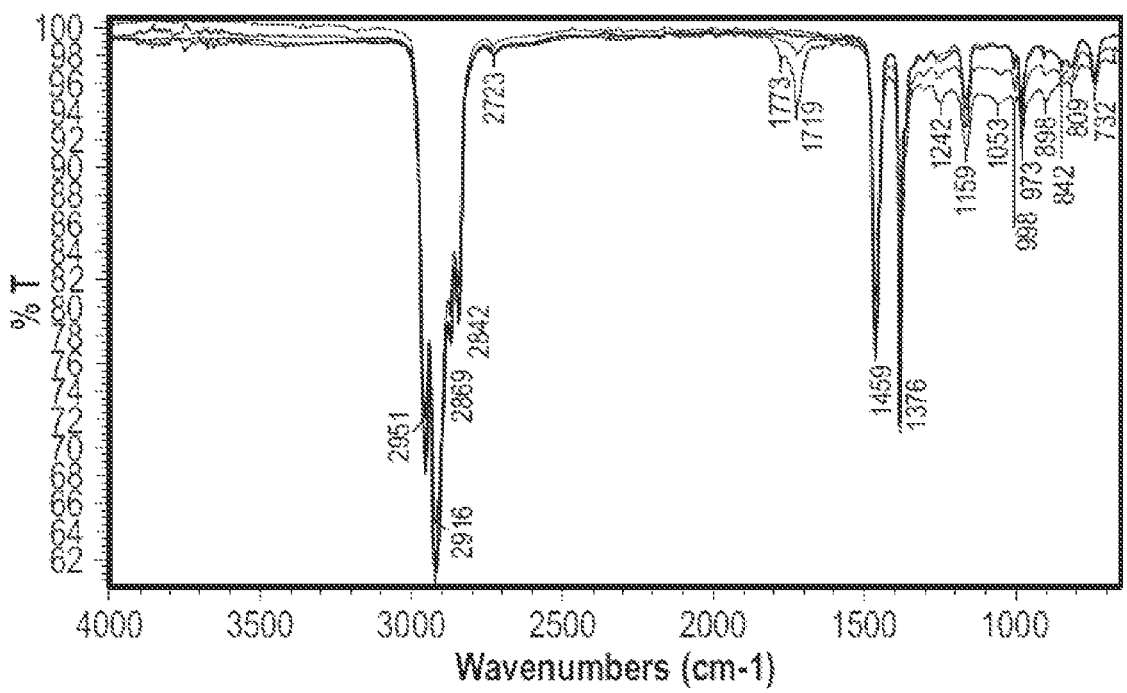
FIG. 3 is a plurality of FTIR spectra taken over time, showing the functionalization of a propylene-based elastomer according to embodiments of the disclosure.

FIG. 3 show the FT-IR spectra of VM6102 taken at various time intervals while being heated at 200° C. in air. As these data show, absorptions consistent with the formation of carbonyl functional groups as well as other oxygen containing functional groups, appear over time.

Figure 4:
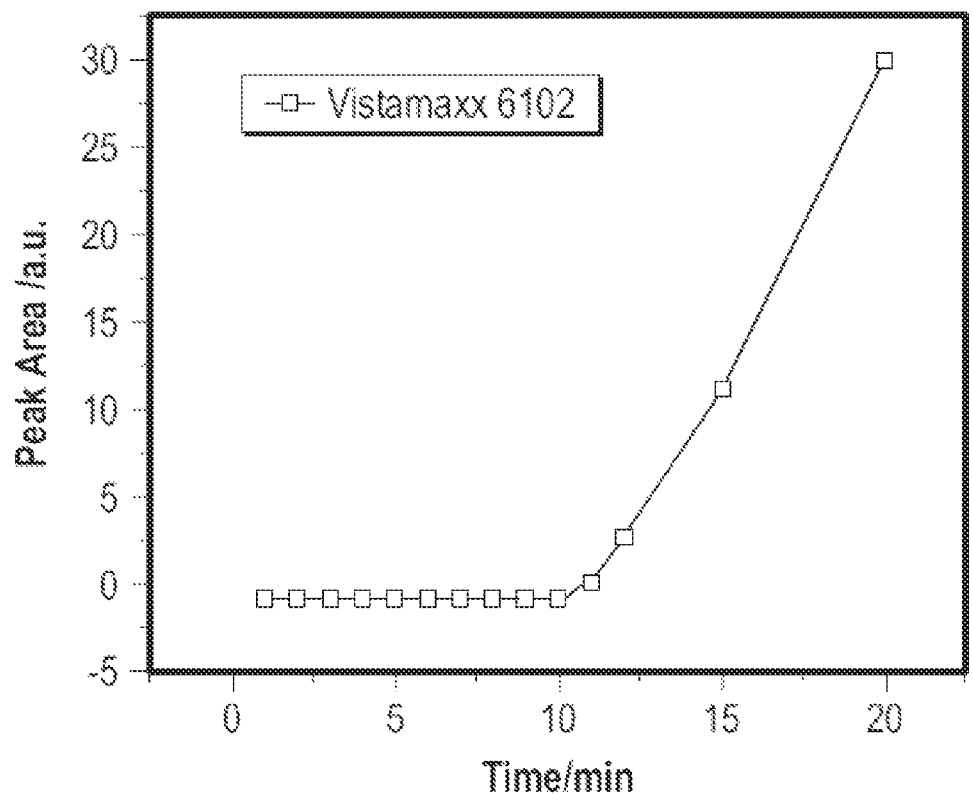
FIG. 4 is a plot showing the formation of oxygen containing functional groups over time in a functionalized propylene-based elastomer according to embodiments of the disclosure.

FIG. 4 shows a plot of the normalized, relative peak area of infrared absorptions attributable to oxygen containing functional groups relative to reaction time at 200° C. for the data shown in FIG. 3. As these data show, the ratio of carbonyl group to raw or unfunctionalized PBE is from about 0-30% based on these data. FIG. 4 also confirms that the amount of functionalization may be controlled by selecting an appropriate reaction time for producing the functionalized propylene-based elastomers at a particular temperature or within a particular temperature range.

Examples of the types of reaction products thought to be formed during the functionalization process, which are further suggested by the infrared data, include the following:

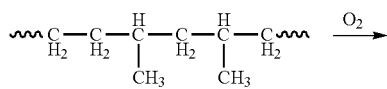

i) ethers:

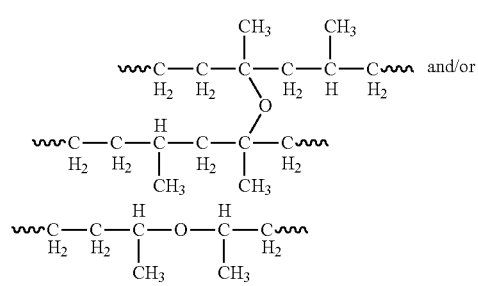

ii) ketones

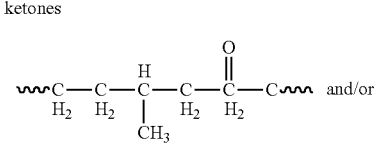

iii) esters

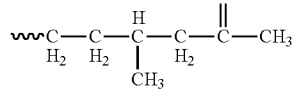

iv) lactones

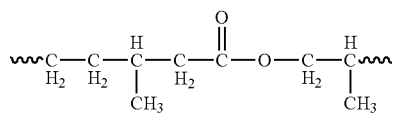

v) anhydrides

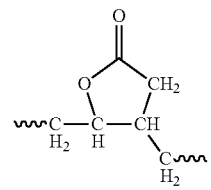

vi) carboxylic acids; and

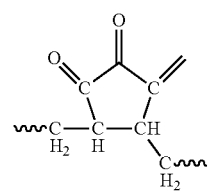

vii) carbonates.

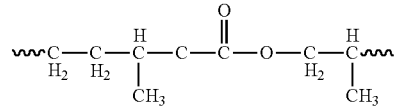

For brevity, functionalization within a single polymer chain is shown, however, it is to be understood that such functionalization may be present at the ends of each polymer chain as shown with respect to ketones, and/or between two or more polymer chains as shown above with respect to ether functional groups.

Table 3A lists the GPC data for the untreated propylene-based elastomers (PBE) and the functionalized propylene-based elastomers (f-PBE) after thermal treatment with oxygen (air) at the indicated temperature. For these examples, the air present was the result of air which was taken into the extruder during operation. No additional air was supplied to the extruder and the nitrogen purge equipment provided with the extruder was turned off. The PBE were fed into a twin screw extruder operating at a screw speed of 180 RPM at the indicated temperature with a residence time of 10 minutes.

TABLE 3A

| | PBE | | | f-PBE @ 270° C. | | | f-PBE @ 270° C. | | |
|---|---|---|---|---|---|---|---|---|---|
| Example | Mn | MWD | $C_2$ (wt %) | Mn | MWD | $C_2$ (wt %) | Mn | MWD | $C_2$ (wt %) |
| VX3588 | 98787 | 2.15 | 3.59 | 98974 | 2.13 | 3.69 | 88915 | 2.13 | 3.62 |
| VX6202 | 67690 | 2.02 | 12.35 | 47726 | 2.33 | 10.45 | 55671 | 2.26 | 11.79 |
| VX3980 | 94240 | 2.07 | 7.41 | 92323 | 2.12 | 7.10 | 84710 | 2.11 | 7.11 |

Table 3B shows the relative percent change ("Δ %") in the value of the f-PBE relative to the untreated PBE according to the following formula.

Δ%=[(PBE−f-PBE)/PBE]*100%

TABLE 3B

| | PBE | | | f-PBE @ 270° C. | | | f-PBE @ 270° C. | | |
|---|---|---|---|---|---|---|---|---|---|
| Example | Mn | MWD | $C_2$ (wt %) | Mn Δ % | MWD % | $C_2$ (wt %) % | Mn % | MWD % | $C_2$ (wt %) % |
| VX3588 | n/a | n/a | n/a | −0.2% | 0.9% | −2.8% | 10.0% | 0.9% | −0.8% |
| VX6202 | n/a | n/a | n/a | 29.5% | −15.3% | 15.4% | 17.8% | −11.9% | 4.5% |
| VX3980 | n/a | n/a | n/a | 2.0% | −2.4% | 4.2% | 10.1% | −1.9% | 4.0% |

As these data show, no significant chain scission or other destruction of the PBE happened during the functionalization via compounding processing, even under 270° C. These data agree with other data which show that the physical properties of the f-PBE do not significantly change due to functionalization, except for those dependent on the polarity of the elastomer such as water contact angle and the forming of stable blends with other materials.

Hydrophobicity

Several compositions were prepared from the three components listed in Table 4.

TABLE 4

| Component | Material | Description |
|---|---|---|
| PP | PP3155E3 | Isotactic polypropylene, MFR 35 (ExxonMobil) |
| VM7050 | Vistamaxx 7050 | Propylene-based elastomer, 13wt % ethylene, MFR 48 (ExxonMobil) |
| VM7020 | Vistamaxx 7020 | Propylene-based elastomer, 17wt % ethylene, MFR 20 (ExxonMobil) |

The following exemplary and comparative blends were prepared according to the following table.

Blends were prepared according to embodiments disclosed herein by preparing a blend of the indicated materials (or a single material) and then directing the feed mixture into a twin screw extruder having an 11 cm barrel heated to the indicated temperature. Inventive examples were mixed in the extruder in the present of oxygen by purging the extruder with compressed air. Comparative examples were mixed in the extruder under nitrogen. All blends were mixed at 200 rpm at the indicated temperature for a total residence time of 10 minutes. For the inventive samples, the functionalized propylene-based elastomer was formed in the presence of the polyalphaolefin (i.e., isotactic polypropylene).

Samples suitable for determining the static contact angle were prepared by compress molding at 190° C. for 5 minutes. The static contact angle was then determined according to ASTM D7490. To prevent functionalization, the comparative examples were prepared for contact angle measurement by compress molding at 180° C. for 5 minutes under nitrogen. These data are presented in Table 5.

TABLE 5

| Example | Composition (wt %) | Temperature (° C.) | Contact angle (°) |
|---|---|---|---|
| Comparative Ex. 1 | 100 wt % PP | n/a | 95.5° ± 1.9 |
| Comparative Ex. 2 | 100 wt % VM7050 | n/a | 97.1° ± 2.1 |
| Comparative Ex. 4 | 100 wt % VM7020 | n/a | 90.2° ± 2.1 |
| Comparative Ex. 5 | 80 wt % PP 20 wt % VM7020 | 180°C $N_2$ purge | 98.1° ± 2.0 |
| Comparative Ex. 6 | 100 wt % VM7050 | 220° C. | 84.1° ± 2.1 |
| Comparative Ex. 7 | 100 wt % VM7020 | 230° C. | 84.9° ± 1.3 |
| Comparative Ex. 8 | 100 wt % PP | 230° C. | 97.8° ± 1.9 |
| Comparative Ex. 9 | 100 wt % VM7020 | 250° C. | 84.9° ± 1.3 |
| Comparative Ex. 10 | 100 wt % PP | 250° C. | 90.1° ± 1.8 |
| Ex. 11 | 60 wt % PP 40 wt % VM7050 | 220° C. | 80.9° ± 2.4 |
| Ex. 12 | 30 wt % PP 70 wt % VM7050 | 220° C. | 78.4° ± 1.5 |
| Comparative Ex. 13 | 100 wt % VM7020 | 230° C. | 84.9° ± 1.3 |
| Ex. 14 | 95 wt % PP 5 wt % VM7020 | 230° C. | 93.6° ± 2.2 |
| Ex. 15 | 90 wt % PP 10 wt % VM7020 | 230° C. | 84.4° ± 2.7 |
| Ex. 16 | 80 wt % PP 20 wt % VM7020 | 230° C. | 82.5° ± 1.6 |
| Ex. 17 | 70 wt % PP 30 wt % VM7020 | 230° C. | 80.3° ± 1.9 |

TABLE 5-continued

| Example | Composition (wt %) | Temperature (° C.) | Contact angle (°) |
|---|---|---|---|
| Ex. 18 | 50 wt % PP 50 wt % VM7020 | 230° C. | 92.9° ± 2.8 |
| Ex. 19 | 30 wt % PP 70 wt % VM7020 | 230° C. | 89.5° ± 2.1 |
| Ex. 20 | 10 wt % PP 90 wt % VM7020 | 230° C. | 84.7° + 1.9 |
| Comparative Ex. 21 | 100 wt % VM7020 | 250° C. | 84.9° ± 1.3 |
| Ex. 22 | 90 wt % PP 10 wt % VM7020 | 250° C. | 87.5° ± 1.4 |
| Ex. 23 | 80 wt % PP 20 wt % VM7020 | 250° C. | 91.7° ± 1.6 |
| Ex. 24 | 50 wt % PP 50 wt % VM7020 | 250° C. | 86.5° ± 2.0 |
| Ex. 25 | 30 wt % PP 70 wt % VM7020 | 250° C. | 87.1° ± 1.6 |
| Ex. 26 | 10 wt % PP 90 wt % VM7020 | 250° C. | 88.6° ± 2.5 |

As these data show, the comparative examples of the neat materials without any processing (Comp. Ex. 1, 2, and 3) show the materials are hydrophobic prior to functionalization. Comparative example 4 confirms that the melt mixed blend, without functionalization, remains hydrophobic.

Comparative examples 6, 7, 9, 13, and 21 confirm that the propylene-based elastomers, when functionalized with oxygen at the indicated temperatures, transform into a hydrophylic material. Comparative examples 8 and 10 confirm that the hydrophobic character of the polyalphaolefin (iPP) does not change when reacted with oxygen according to embodiments of this disclosure. The remaining examples further indicate that the hydrophilic character of various blended compositions may be tailored by controlling the functionalization temperature, residence time, and relative proportion of functionalized propylene-based elastomer present in the material.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition comprising:
   i) a $C_2$-$C_{12}$ polyalphaolefin; and
   ii) a functionalized propylene-based elastomer comprising from about 4 to about 25 wt % units derived from one or more $C_2$ or $C_4$-$C_{12}$ alpha-olefins;
   a triad tacticity greater than about 90%;
   a heat of fusion less than about 75 J/g; and
   a plurality of oxygen containing functional groups selected from carboxylic acids, anhydrides, ketones, carbonates, esters, ethers, lactones, and combinations thereof,
   wherein the functionalized propylene-based elastomer is a reaction product of:
   i) an oxygen containing gas; and
   ii) a first propylene-based elastomer comprising from about 4 to about 25 wt % of units derived from one or more $C_2$ or $C_4$-$C_{12}$ alpha-olefins and having a triad tacticity greater than about 90% and a heat of fusion less than about 75 J/g,
   when contacted at a temperature above about 200° C. and less than or equal to about 260° C., for a period of time greater than about 1 minute.

2. The composition of claim 1, wherein the functionalized propylene-based elastomer comprises from about 0.01 wt % to about 10 wt % oxygen, based on the total amount of the functionalized propylene-based elastomer present.

3. The composition of claim 1, wherein the functionalized propylene-based elastomer comprises an MFR greater than or equal to about 20, when determined according to ASTM D-1238 (condition L, i.e., 2.16 kg weight @ 230° C.).

4. The composition of claim 1, wherein the functionalized propylene-based elastomer comprises ethylene.

5. The composition of claim 4, wherein the functionalized propylene-based elastomer comprises from about 10 to 25 wt % ethylene, based on the total amount of the functionalized propylene-based elastomer present.

6. The composition of claim 1 having a static water contact angle of less than 90°, when determined according to ASTM D7490.

7. The composition of claim 1, wherein the polyalphaolefin comprises greater than about 50 mol % propylene.

8. The composition of claim 7, wherein the polyalphaolefin further comprises ethylene, butene, pentene, hexene, 4-methyl-1-pentene, octene, decene, or a combination thereof.

9. The composition of claim 1, comprising from about 10 wt % to about 40 wt % of the functionalized propylene-based elastomer, based on the total amount of the functionalized propylene-based elastomer and the polyalphaolefin present.

10. The composition of claim 1, comprising from about 70 wt % to about 90 wt % of the functionalized propylene-based elastomer, based on the total amount of the functionalized propylene-based elastomer and the polyalphaolefin present.

11. A method comprising:
   contacting a first propylene-based elastomer with an oxygen containing gas at a temperature greater than or equal to about 200° C. for a period of time sufficient to form a functionalized propylene-based elastomer comprising from about 4 to about 25 wt % units derived from one or more $C_2$ or $C_4$-$C_{12}$ alpha-olefins;

a triad tacticity greater than about 90%;

a heat of fusion less than about 75 J/g; and greater than about 0.1 wt % of oxygen containing functional groups selected from carboxylic acids, anhydrides, ketones, carbonates, esters, ethers, lactones, and combinations thereof; and melt mixing the functionalized propylene-based elastomer with one or more $C_2$-$C_{12}$ polyalphaolefins to form a blended composition.

12. The method of claim 11, wherein the first propylene-based elastomer is contacted with the oxygen containing gas at a temperature from about 230° C. to about 260° C. for a period of time greater than about 5 minutes.

13. The method of claim 11, wherein the first propylene-based elastomer is contacted with the oxygen containing gas at the temperature greater than or equal to about 200° C. in the absence of an antioxidant and/or an antioxidant package.

14. The method of claim 11, wherein the first propylene-based elastomer comprises from about 10 to 25 wt % ethylene, based on the total amount of the first propylene-based elastomer present.

15. The method of claim 11, wherein the first propylene-based elastomer is mixed with the polyalphaolefin prior to, or melt mixed simultaneous with said contacting of the first propylene-based elastomer with the oxygen containing gas at the temperature greater than or equal to about 200° C. for the period of time sufficient to form the functionalized propylene-based elastomer.

16. The method of claim 15, wherein the first propylene-based elastomer and the polyalphaolefin are blended together prior to said melt mixing, and fed into an extruder wherein said contacting of the first propylene-based elastomer with the oxygen containing gas at the temperature greater than or equal to about 200° C. for the period of time sufficient to form the functionalized propylene-based elastomer conducted.

17. The method of claim 11, wherein the blended composition has a static water contact angle of less than 90°, when determined according to ASTM D7490.

18. An article comprising:
i) a $C_2$-$C_{12}$ polyalphaolefin; and
ii) a functionalized propylene-based elastomer comprising from about 4 to about 25 wt % units derived from one or more $C_2$ or $C_4$-$C_{12}$ alpha-olefins;

a triad tacticity greater than about 90%;

a heat of fusion less than about 75 J/g; and a plurality of oxygen containing functional groups selected from carboxylic acids, anhydrides, ketones, carbonates, esters, ethers, lactones, and combinations thereof, wherein the functionalized propylene-based elastomer is a reaction product of:
i) an oxygen containing gas; and
ii) a first propylene-based elastomer comprising from about 4 to about 25 wt % of units derived from one or more $C_2$ or $C_4$-$C_{12}$ alpha-olefins and having a triad tacticity greater than about 90% and a heat of fusion less than about 75 J/g.

19. The article of claim 18, having a static water contact angle of less than 90°, when determined according to ASTM D7490.

20. The article of claim 18, wherein the article is a nonwoven fabric, a diaper, or a film.

* * * * *